United States Patent
Lancuba et al.

(10) Patent No.: US 12,449,367 B2
(45) Date of Patent: Oct. 21, 2025

(54) MAGNETIC CONFINEMENT OF ARC DISCHARGE MIGRATION IN SPARK OES SYSTEMS

(71) Applicant: THERMO ELECTRON SCIENTIFIC INSTRUMENTS LLC, Madison, WI (US)

(72) Inventors: Patrick Lancuba, Fitchburg, WI (US); Matthew Spencer Neighbour, Le-Mont-sur-Lausanne (CH)

(73) Assignee: THERMO ELECTRON SCIENTIFIC INSTRUMENTS LLC, Madison, WI (US)

( * ) Notice: Subject to any disclaimer, the term of this patent is extended or adjusted under 35 U.S.C. 154(b) by 276 days.

(21) Appl. No.: 18/298,925

(22) Filed: Apr. 11, 2023

(65) Prior Publication Data

US 2024/0344994 A1 Oct. 17, 2024

(51) Int. Cl.
*G01N 21/67* (2006.01)
*H01F 27/28* (2006.01)
*H01F 38/00* (2006.01)
*H01T 15/00* (2006.01)

(52) U.S. Cl.
CPC .............. *G01N 21/67* (2013.01); *H01F 27/28* (2013.01); *H01F 38/00* (2013.01); *H01T 15/00* (2013.01)

(58) Field of Classification Search
None
See application file for complete search history.

(56) References Cited

U.S. PATENT DOCUMENTS

| | | | |
|---|---|---|---|
| 3,437,862 A | 4/1969 | Salisbury | |
| 3,681,600 A * | 8/1972 | Rigden | H01J 49/488 250/305 |
| 3,809,896 A * | 5/1974 | Schuy | H01J 49/022 250/424 |
| 3,815,995 A * | 6/1974 | Walters | G01N 21/67 356/313 |
| 4,255,051 A * | 3/1981 | Imamura | G01J 3/36 356/306 |
| 4,341,470 A * | 7/1982 | Parker | G01N 21/3103 356/315 |
| 5,468,363 A | 11/1995 | Falabella | |
| 5,699,155 A * | 12/1997 | Sugihara | G01N 21/67 356/313 |
| 6,589,793 B1 * | 7/2003 | Appelt | G01N 21/21 436/79 |
| 7,821,634 B2 * | 10/2010 | Dillon | G01N 21/718 356/318 |
| 2007/0296412 A1 * | 12/2007 | Appelt | G01N 24/087 324/307 |

(Continued)

*Primary Examiner* — Kenneth B Wells
(74) *Attorney, Agent, or Firm* — Leron Vandsburger

(57) ABSTRACT

Analytical instrument systems, components, and methods for stabilizing discharge formation are described. A spark gap device includes a first planar coil, defining an axis normal to a coil plane and defining a first aperture substantially centered about the axis. The spark gap device includes a second planar coil, offset from the first planar coil along the axis and substantially parallel with the coil plane, the second planar coil defining a second aperture substantially centered about the axis. The spark gap device also includes a conductive element disposed in the first aperture and substantially aligned with the axis.

19 Claims, 9 Drawing Sheets

(56) References Cited

U.S. PATENT DOCUMENTS

| | | | | |
|---|---|---|---|---|
| 2008/0224626 A1* | 9/2008 | Kawato | ............... | H05B 41/38 |
| | | | | 315/219 |
| 2011/0228269 A1* | 9/2011 | Vincent | ................ | G01J 3/443 |
| | | | | 356/313 |
| 2014/0268132 A1* | 9/2014 | Hamilton | ............ | G01J 3/0229 |
| | | | | 356/310 |
| 2015/0001387 A1* | 1/2015 | Boumsellek | ........ | G01N 27/68 |
| | | | | 250/288 |
| 2017/0097304 A1* | 4/2017 | Schroeder | .......... | G01N 21/67 |
| 2018/0321164 A1* | 11/2018 | Cameron | ............ | G01N 22/00 |

\* cited by examiner

MAGNETIC CONFINEMENT OF ARC DISCHARGE MIGRATION IN SPARK OES SYSTEMS

TECHNICAL FIELD

Embodiments of the present disclosure are directed to analytical instrument systems, as well as techniques for their operation. In particular, some embodiments are directed toward optical emission spectroscopy systems.

BACKGROUND

Spectroscopic techniques can be applied to bulk materials, such as composites, ores, alloys, etc., as an approach to generating chemical, physical, or other material data (e.g., purity, composition, phase, or the like). In spark optical emission spectroscopy (spark OES) systems, a bulk sample is biased relative to a counter electrode and used to generate an arc discharge, typically in an inert atmosphere. Photons are collected from the arc discharge by a spectrometer that generates spectrum data, from which elemental and compositional analysis can be conducted. Useful information, such as element identification, relative compositions, absolute compositions, etc, can be collected based at least in part on the presence and/or intensities of characteristic spectral peaks found in spark OES data.

The quality of spark OES data is limited by the tendency of the arc attachment point to migrate on the surface of the sample between ignitions. Arc migration results in movement of the discharge region relative to an optical collection region of the spectrometer, thereby impairing signal-to-noise quality of spectra. For example, arc migration can reduce the relative intensity of spectral lines that are present in regions of the arc discharge that are characterized by a relatively higher plasma temperature. Similarly, arc migration can increase the relative intensity of spectral lines attributable to lower energy species and recombination products that are present in relatively lower temperature zones of the arc discharge. There is a need, therefore, for systems, devices, and techniques for reducing arc migration during spark OES measurements.

SUMMARY

In one aspect, a spark gap device includes a first planar coil, defining an axis normal to a coil plane and defining a first aperture substantially centered about the axis. The spark gap device includes a second planar coil, offset from the first planar coil along the axis and substantially parallel with the coil plane, the second planar coil defining a second aperture substantially centered about the axis. The spark gap device also includes a conductive element disposed in the first aperture and substantially aligned with the axis.

The first planar coil and/or the second planar coil can define a number of turns from about 10 turns to about 50 turns. The first aperture and/or the second aperture can be characterized by a width from about 100 µm to about 10 cm. The second planar coil can be offset from the first planar coil by a distance from about 1 mm to about 50 mm. The first planar coil and/or the second planar coil can be electrically coupled with a capacitor having a capacitance rating from about 10 µF to about 1000 µF. The spark gap device can further include a first insulating layer disposed over at least part of the first planar coil and a second insulating layer disposed over at least part of the second planar coil, where the first insulating layer and the second insulating layer comprise an electrically insulating and thermally conducting material. The spark gap device can further include a first substrate, thermally coupled with the first planar coil and electrically isolated from the first planar coil, and a second substrate, thermally coupled with the second planar coil and electrically isolated from the second planar coil. Other technical features can be readily apparent to one skilled in the art from the following figures, descriptions, and claims.

The first insulating layer and/or the second insulating layer can include one or more materials selected from a group consisting of aluminum nitride, boron nitride, silicon carbide-carbon composite, fiberglass-reinforced silicone, diamond-like carbon, and synthetic diamond. The spark gap device can also include one or more heat removal elements, being thermally coupled with the first substrate or the second substrate and configured to draw heat from the first planar coil and/or the second planar coil.

In one aspect, a spectroscopy system includes a spark gap device in accordance with the preceding aspect and electronic circuitry operably coupled with the spark gap device. The electronic circuitry can include a voltage source electrically coupled with the conductive element and a capacitor electrically coupled with the first planar coil or the second planar coil. The spectroscopy system also includes a controller, operably coupled with the electronic circuitry and configured to execute operations includes discharging the capacitor and applying a voltage to the conductive element. The spectroscopy system can also include an isolation chamber, at least a portion of the spark gap device being disposed in the isolation chamber, the isolation chamber being configured to provide a controlled environment in the vicinity of the conductive element. Other technical features can be readily apparent to one skilled in the art from the following figures, descriptions, and claims.

The operations can further include generating a timing signal characterized by a frequency from about 50 Hz to about 2000 Hz, where the controller is configured to use the timing signal to orchestrate at least some of the operations. The operations can further include removing the voltage from the conductive element and charging the capacitor. The capacitor can be configured to discharge a current from about 100 A to about 5 kA into the first planar coil or the second planar coil. The spectroscopy system can further include an optical spectrometer, oriented relative to the spark gap device to observe a region between the first planar coil and the second planar coil and near a tip of the conductive element. The operations can also include generating spectrum data using the optical spectrometer.

In one aspect, one or more non-transitory machine-readable storage media, store instructions that, when executed by a machine, cause the machine to perform operations including discharging a capacitor, the capacitor being electrically coupled with a first planar coil or a second planar coil of a spark gap device of any of the preceding aspects. The operations can also include applying a voltage to the conductive element of the spark gap device. The operations can include removing the voltage from the conductive element. The operations can include charging the capacitor. A sequence of operations for the spark gap device can include discharging the capacitor, applying the voltage, removing the voltage, and charging the capacitor, and where generating spectrum data can coincide at least partially with applying the voltage. Other technical features can be readily apparent to one skilled in the art from the following figures, descriptions, and claims.

The operations can further include generating a timing signal, characterized by a frequency from about 50 Hz to about 2000 Hz, where the controller is configured to use the timing signal to orchestrate at least some of the operations. The operations can further include generating spectrum data using an optical spectrometer oriented relative to the spark gap device to observe a region between the first planar coil and the second planar coil. Other technical features can be readily apparent to one skilled in the art from the following figures, descriptions, and claims.

The terms and expressions which have been employed are used as terms of description and not of limitation, and there is no intention in the use of such terms and expressions of excluding any equivalents of the features shown and described or portions thereof, but it is recognized that various modifications are possible within the scope of the claimed subject matter. Thus, it should be understood that although the present claimed subject matter has been specifically disclosed by embodiments and optional features, modification and variation of the concepts herein disclosed can be resorted to by those skilled in the art, and that such modifications and variations are considered to be within the scope of this disclosure as defined by the appended claims.

BRIEF DESCRIPTION OF THE SEVERAL VIEWS OF THE DRAWINGS

The foregoing aspects and many of the attendant advantages of the present disclosure will become more readily appreciated as the same become better understood by reference to the following detailed description, when taken in conjunction with the accompanying drawings.

Figure 1A:
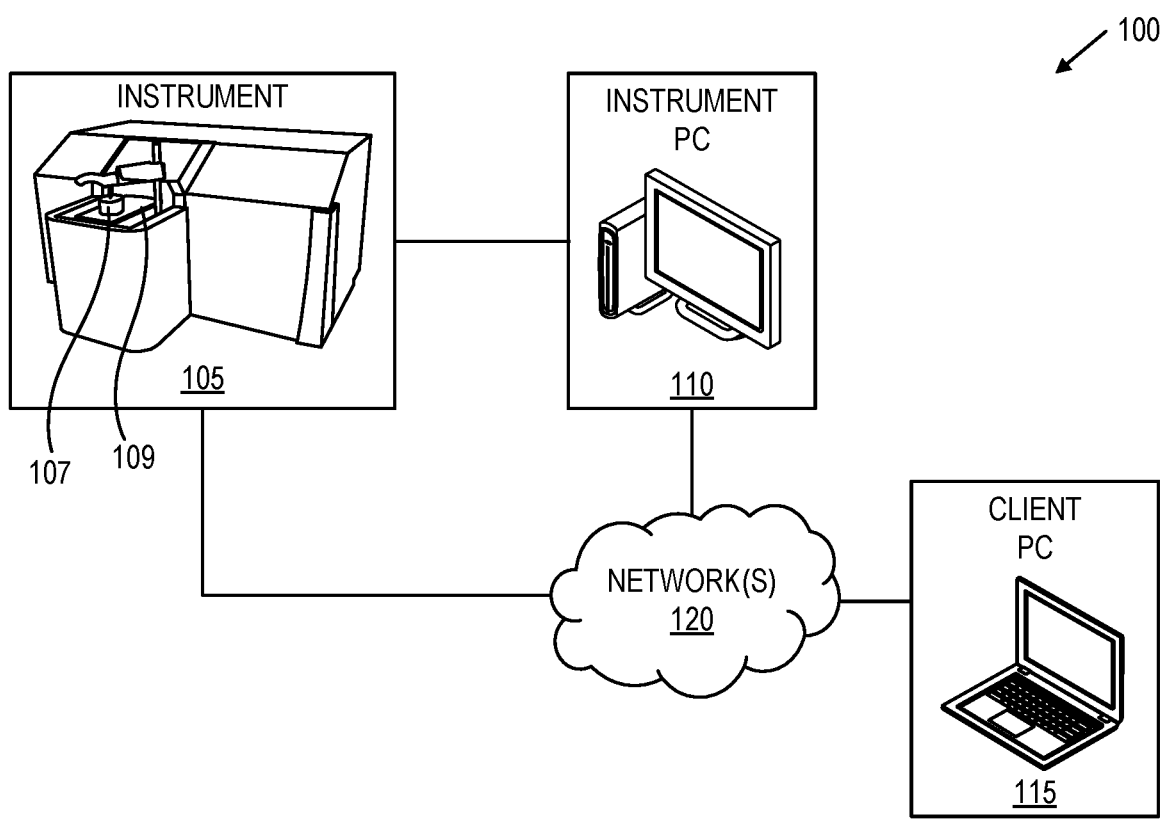
FIG. 1A is a schematic diagram illustrating an example analytical instrument system, in accordance with some embodiments of the present disclosure.

In the drawings, like reference numerals refer to like parts throughout the various views unless otherwise specified. Not all instances of an element are necessarily labeled to reduce clutter in the drawings where appropriate. The drawings are not necessarily to scale, emphasis instead being placed upon illustrating the principles being described.

DETAILED DESCRIPTION

While illustrative embodiments have been illustrated and described, it will be appreciated that various changes can be made therein without departing from the spirit and scope of the disclosure. In the forthcoming paragraphs, embodiments of an analytical instrument system, components, and methods for stabilizing discharge formation are described. Embodiments of the present disclosure focus on magnetic confinement of arc discharge migration in spark optical emission spectroscopy (spark OES) and related instruments in the interest of simplicity of description. To that end, embodiments are not limited to such instruments, but rather are contemplated for analytical instrument systems where analysis of bulk material composition can be complicated by the tendency of discharges to migrate and/or spread over the surface of the bulk material over a significant distance relative to an optical collection region of a spectrometer. In an illustrative example, spark OES signal quality can be significantly impaired as a result of arc migration and/or expansion, resulting in increased integration time and reduced system efficiency. To that end, analytical systems can benefit from stabilizing the attachment of discharges and/or compressing discharges, such that the optical collection region includes the discharge with relatively little or negligible temporal variation. Similarly, while embodiments of the present disclosure focus on arc discharge systems (termed "spark OES"), additional and/or alternative discharge modalities are contemplated, including but not limited to volumetric "glow" discharge systems for which OES data are generated from a region of the discharge that can be affected by temporal instability.

Embodiments of the present disclosure include systems, devices, methods, algorithms, and non-transitory media storing computer-readable instructions for stabilizing discharges. In an illustrative example, a spectroscopy system can include a first planar coil, defining an axis normal to a coil plane and defining a first aperture substantially centered about the axis. The system can include a second planar coil, offset from the first planar coil along the axis and substantially parallel with the coil plane, the second planar coil defining a second aperture substantially centered about the axis. The system can also include a conductive element disposed in the first aperture and substantially aligned with the axis. Passing current through the coil(s) can induce a magnetic field to form between the coils. With coordination of magnetic field generation and arc discharge formation between the conductive element and a sample, magnetic confinement of arc discharge migration can improve signal-to-noise quality of spectral data, while also reducing integration time and improving efficiency of spectroscopy systems.

FIG. 1A is a schematic diagram illustrating an example analytical instrument system 100, in accordance with some embodiments of the present disclosure. Example system 100 includes components configured generate, store, transmit, and/or process spectral data. In the illustrated embodiment of FIG. 1A, example system 100 includes an instrument 105, an instrument PC (IPC) 110, and a client PC 115, wherein one or more of the constituent components of example system 100 can communicate over one or more networks 120.

Instrument 105 can include sample handling and loading components, optics components, and electronic and/or electromechanical components that, together, configure instrument 105 to generate an arc discharge using a material sample 107 (e.g., a bulk material, composite, alloy, ore, or the like) as an electrode. In some embodiments, instrument 105 includes a mechanical retention apparatus with a lever or other member configured to apply a force on sample 107. In this way, sample 107 can be removably placed against a seal, gasket, or other material, as an approach to isolating at least a portion of sample 107 in an inert atmosphere enclosed in an isolation chamber 109, as described in more detail in reference to FIG. 2A. For example, instrument 105 can include an aperture through which sample 107 can be introduced to an inert or otherwise controlled atmosphere different from the ambient atmosphere of instrument 105. Through a combination of forces applied to sample 107 (e.g., by negative pressure in instrument 105 and/or force of the retention apparatus), sample 107 can form a seal against a surface of instrument 105. Isolation from the ambient atmosphere of instrument 105 permits OES spectra to be generated using known and/or controlled gases with known and/or controlled compositions for discharge formation, allowing, in turn, detailed information about sample composition to be derived from spectral peak information.

Figure 1B:
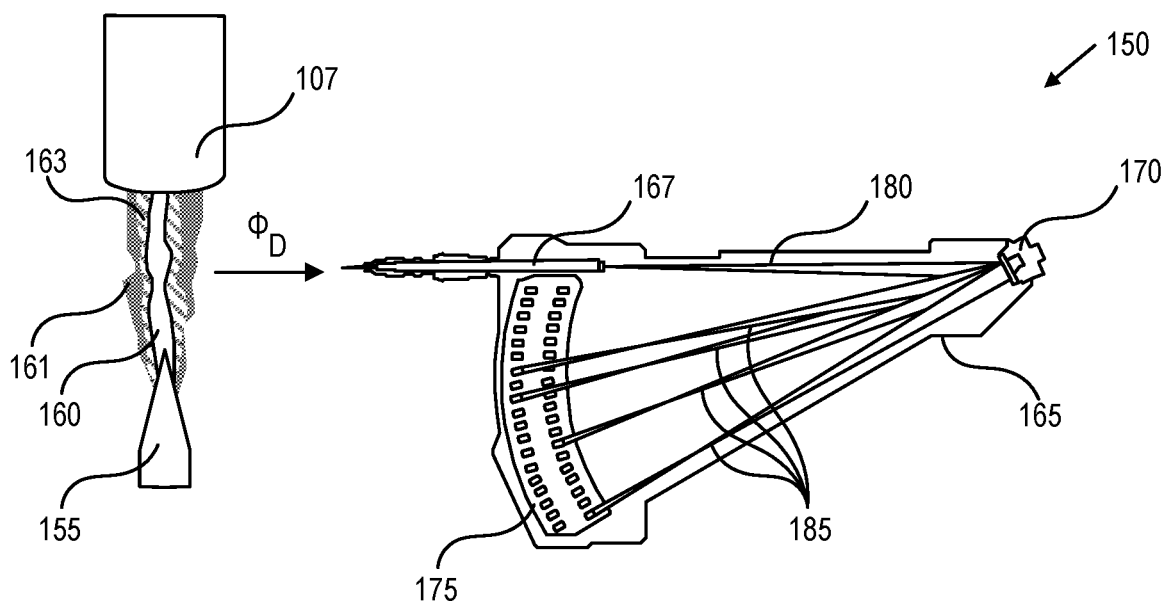
FIG. 1B is a schematic diagram illustrating an example spark optical emission spectroscopy configuration, in accordance with some embodiments of the present disclosure.

As described in more detail in reference to FIG. 1B, instrument 105 can generate spectrum data by collecting at least a portion of the electromagnetic radiation emitted from one or more arc discharges formed using sample 107 as an electrode, as part of an optical emission spectroscopy (OES) technique including the use of magnetic field confinement of the arc discharge(s). To that end, IPC 110 and/or client PC 115 can coordinate the operations of instrument 105 forming at least part of the OES technique. For example, instrument 105 can include electronics components, such as capacitors, conductive coils, heat transfer components, voltage supplies, and control circuitry, as described in more detail in reference to FIGS. 2A-5, for which IPC 110 and/or client PC 115 can orchestrate the respective operations of the various components. In some embodiments, IPC 110 is functionally integrated into instrument 105 (e.g., as a circuit board stored internal to a housing of instrument 105), but IPC 110 can also be a physically separate user-accessible computing device including user interface components (e.g., peripherals and a display). IPC 110 and/or client PC 115 can be or include one or more types of computing devices including, but not limited to, personal computing devices, special purpose computing devices configured to coordinate the operation of multiple instruments including instrument 105 (e.g., an application specific machine, or ASM). In some embodiments, IPC 110 and/or client PC 115 coordinates the operation of multiple instruments including instrument 105 in parallel, as part of a continuous or semi-continuous sample analysis technique, communicating via network(s) 120. Network(s) 120 can include private networks (e.g., intranet or local area networks, or LANs), public networks (e.g., internet), and/or communications networks (e.g., cellular and/or satellite).

FIG. 1B is a schematic diagram illustrating an example spark optical emission spectroscopy configuration 150, in accordance with some embodiments of the present disclosure. Example configuration 150 is an example of an optical emission spectroscopy (OES) technique employing the material sample 107 of FIG. 1A as an electrode, a conductive element 155 as a counter electrode, and a spectrometer 165 oriented relative to sample 107 and conductive element 155 and configured to collect at least a portion of electromagnetic flux "ØD" emanating from a discharge 160 ignited between sample 107 and conductive element 155, in accordance with techniques described in reference to FIGS. 2A-7B.

Spectrometer 165 can include optical components including input optics 167, grating or other dispersing optics 170, and detection components 175. Input optics 167 can be oriented toward a collection volume including a region between the sample 107 and the conductive element 155, and can be configured to collect photons emanating from discharge 160. The region can be defined to include a portion of the collection volume near a tip of the conductive element 155. In this context, the term "near" is used to describe an optical alignment/orientation of the spectrometer 165 and/or the input optics 167 that corresponds to increased $\phi_D$ where the discharge 160 moves relatively less nearer to the conductive element 155 than nearer to the sample 107. As an illustrative example, the conductive element 155 can include a taper ending in a tip that is oriented toward the sample 107 and that serves as an attachment point for the discharge 160, such that orienting the input optics 167 toward a region near the tip of the conductive element 155 can improve the temporal stability and intensity of the optical signal (e.g., where the discharge is magnetically confined). Input optics 167 can couple photons into spectrometer 165 as input radiation 180 that can be dispersed as an angular-resolved set of component wavelengths 185 that are registered by one or more detectors of the detection components 175. In some embodiments, grating optics 170 can be mounted on a rotating turret, such that a single detector can be used to scan a range of wavelengths.

Regions of discharge 160 can be characterized by different energy distributions, ionization fractions, $\phi_D$, among other parameters. For example, discharge 160 can include a first outer region 161 from which atomic spectral data can be collected, an a second outer region 163 from which ionic spectral data can be collected, among other plasma structures. In some embodiments, equilibrium conditions can generate continuum radiation that forms background radiation in OES data. To that end, a tendency of arc discharges to migrate over the surface of sample 107 and/or conductive element 155, relative to negligible or no motion of spectrometer 165 optics, can affect the type, intensity, and quality of electromagnetic radiation collected by input optics 167. Advantageously, techniques for magnetic confinement of discharge 160 described in reference to FIGS. 2A-7B, significantly improve the quality of OES spectral data generated by example system 100 relative to comparable systems without magnetic confinement, at least in part due to a suppression of discharge migration and/or compressing the discharge 160.

While sample 107 is illustrated as a cylinder with a substantially flat face and conductive element 155 is illustrated as a cylinder with a conical end, such geometries are intended as non-limiting illustrative embodiments. A conical end can serve to reduce migration of discharge 155 at least in part by concentrating the electric field between conductive element 155 and sample 107, but can also concentrate degradation effects, such as ion bombardment and resistive heating, which can limit the durability of instrument 105 components. To that end, sample 107 and/or conductive element 155 can assume the same configuration or different geometrical configurations. Conductive element 155 can be or include a conductive material (e.g., a metal or other conductive material) that has a relatively low vapor pressure at the temperatures and pressures under which instrument 105 operates and a relatively low susceptibility to sputtering under electron and/or ion bombardment of discharge 160. In an illustrative example, conductive element can be or include tungsten or another conductive material characterized by a relatively low work function.

Figure 2A:
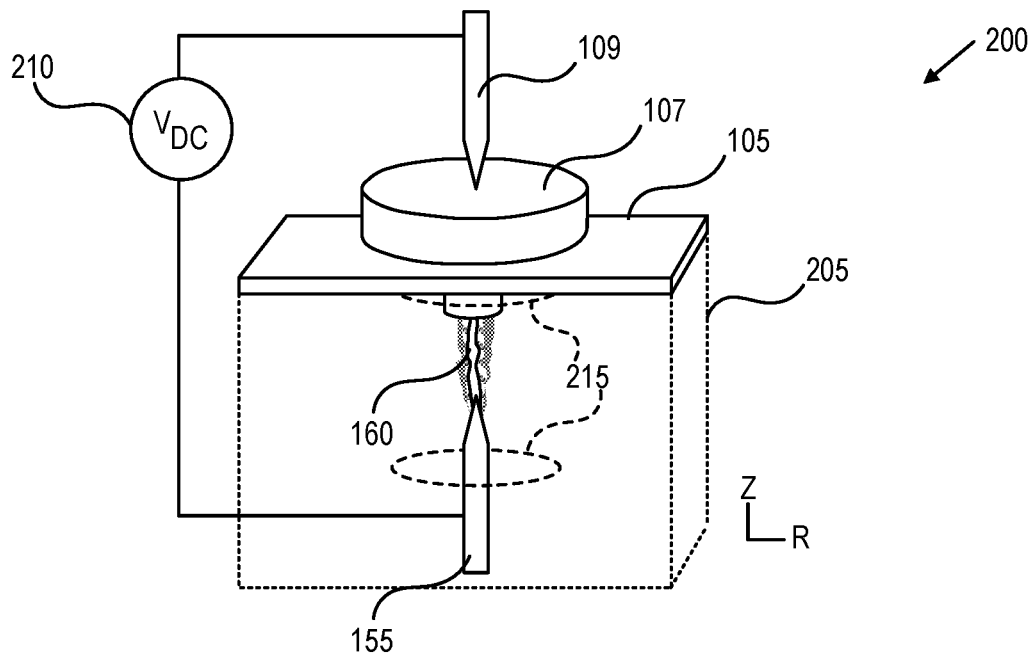
FIG. 2A is a schematic diagram illustrating an example spark gap device for spark OES sample characterization, in accordance with some embodiments of the present disclosure.

FIG. 2A is a schematic diagram illustrating an example spark gap device 200 for spark OES sample characterization, in accordance with some embodiments of the present disclosure. Example system 200 is an example of the configurations illustrated in FIGS. 1A-1B, including a controlled environment 205 internal to instrument 105 (e.g., formed by isolation chamber 109) that isolates at least a portion of conductive element 155 and sample 107 from the ambient environment of instrument 105. Example system 200 further illustrates the contact formed between a surface of instrument 105 and a surface of sample 107 by which a seal can be formed between controlled environment 205 and the ambient environment. Similarly, sample 107 is retained at least in part by a contact with retention apparatus 109, through which sample 107 can be electrically coupled with a voltage source 210. Voltage source 210 can be electronically coupled with conductive element 155 as part of generating/igniting discharge 160 between sample 107 and conductive element 155. In some embodiments, sample 107 is electrically coupled with voltage source 210 independently of retention apparatus 109. Example system 200 also includes two planar coils 215, illustrated for simplicity as ellipses substantially normal to an axis along which conductive element 155 and sample 107 are substantially aligned. Under operation, a voltage applied by voltage source 210 across the gap between sample 107 and conductive element 155 can ignite discharge 160 that, while susceptible to convection effects and other physical phenomena, can be at least partially confined along the axis by the force of a magnetic field generated by current flowing through planar coils 215, As described in more detail in reference to FIG. 3A-3B.

As described in more detail in reference to FIGS. 1A-1B, generating discharge 160 in controlled environment 205 can improve the quality of OES data for sample 107, at least in part by limiting the number and extent of plasma chemical reactions and energy dissipation effects that could attenuate electromagnetic radiation and alter the chemical composition and/or structure of sample 107 (e.g., oxidation, nitridation, etc.). Additionally, generating magnetic fields substantially aligned with the axis normal to one or more coil planes defined by planar coils 215 can reduce migration of discharge 160 during sample analysis, which can include multiple iterations of ignition, discharge, and quenching of discharge 160, As described in more detail in reference to FIGS. 4-5. In some embodiments, voltage source 210 includes a relatively high-voltage (e.g., 1-10 kV$_{DC}$), as compared to 110 V or 210 V line voltage, current regulated power supply that is configured to repeatedly ignite and quench discharge 160, rather than sustain an arc discharge (e.g., voltage regulated operation), which can be destructive to sample 107 and/or conductive element 155 and can generate significant heat.

Figure 2B:
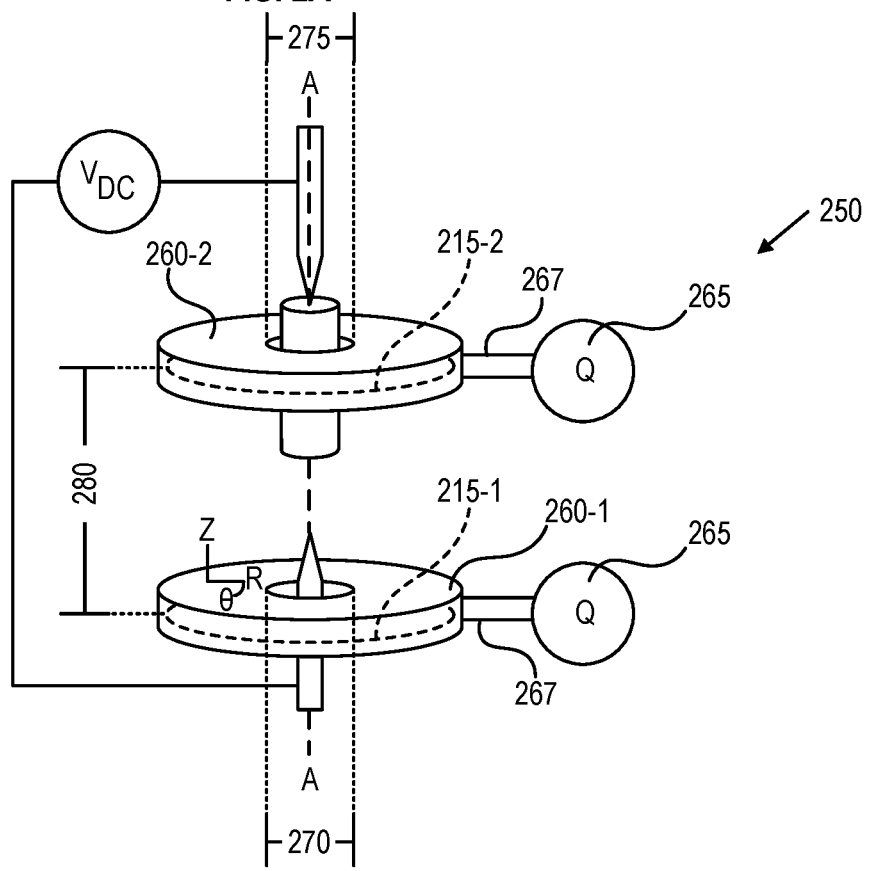
FIG. 2B is a schematic diagram illustrating an example coil system of the spark discharge system of FIG. 2A, in accordance with some embodiments of the present disclosure.

FIG. 2B is a schematic diagram illustrating an example coil system 250 of the spark gap device 200 of FIG. 2A, in accordance with some embodiments of the present disclosure. Example coil system 250 includes a first planar coil 215-1, a second planar coil 215-2, a first substrate 260-1, a second substrate 260-2, one or more heat removal elements 265, and one or more thermal couplings 267. In the context of the present disclosure, the term "planar" is used to refer to a coil having a radiating spiral, curve, or other function for which a conductive path is defined having a substantially consistent value in the "Z" coordinate of a cylindrical coordinate space.

First planar coil 215-1 and/or second planar coil 215-2 can define an axis A parallel to an axial direction "Z" normal to a coil plane "R-θ" and can define a first aperture 270 substantially centered about the axis A. In the configuration illustrated, substrates 260 are annular and substantially centered about axis A. In some embodiments, substrates 260 assume a different shape and/or geometry permitting respective substrates 260 to be thermally coupled with a respective planar coil 215 and electrically isolated from the respective planar coil 215. In this way, first substrate 260-1 and/or second substrate 260-2 can assume a rectangular geometry, an ellipsoidal geometry, polygonal geometry, "horseshoe" geometry, irregular geometries, or the like. In some embodiments, substrates have different shapes, limited for example by a housing of instrument 205 or the constraints of other parts internal to instrument 205 (e.g., spectrometer 260 or the like). A substrate 260 can enclose a planar coil 215 or can leave the planar coil 215 at least partially exposed to the controlled environment 205.

Second planar coil 215-2 can be offset 275 from first planar coil 215-1 along axis A and substantially parallel with the coil plane R-θ. The offset 275 can be from about 1 mm to about 100 mm, including subranges, fractions, and interpolations thereof. Offset 275 can be substantially equal to, greater than, or less than a gap between the sample 107 and the conductive element 155. For values of offset 275 smaller than about 1 mm, magnetic fields between planar coils 215 can exhibit reduced confinement in the "Z" axial direction, whereas for values of offset 275 larger than 5 mm, current demand to generate magnetic field confinement can be impracticable for spark OES devices operating at spark frequencies from about 100 Hz to about 1000 Hz, at least in part due to capacitor sizing and thermal load, including subranges, fractions, and interpolations thereof.

The second planar coil can define a second aperture 275 substantially centered about axis A. First aperture 270 and second aperture 275 can be shaped to accommodate conductive element 155 and sample 107, respectively. For example, apertures 270 and 275 can be characterized by a width from about 100 μm to about 10 cm, including subranges, fractions, and interpolations thereof. Apertures 270 and 275 can be circular, polygonal, ellipsoidal, or irregularly shaped. As magnetic confinement of discharge 160 can be impaired with increasing sizes of apertures 270 and 275, a sample diameter and corresponding aperture size can be identified that balance OES data quality with sample stability under degradation by discharge 160 effects. In some embodiments, apertures 270 and 275 can be about twice or about three times as wide as a width of sample 107 and/or conductive element 155.

Figure 3A:
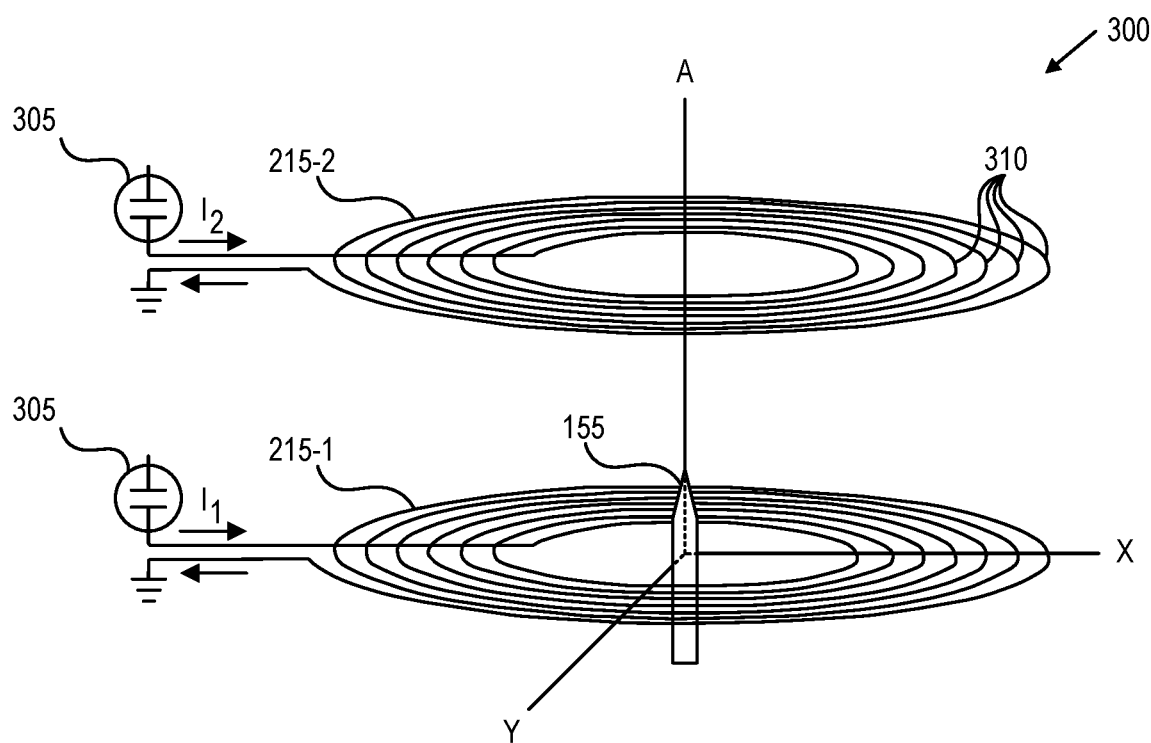
FIG. 3A is a schematic diagram illustrating an example magnetic confinement system for the spark discharge system of FIG. 2A, in accordance with some embodiments of the present disclosure.
Figure 3B:
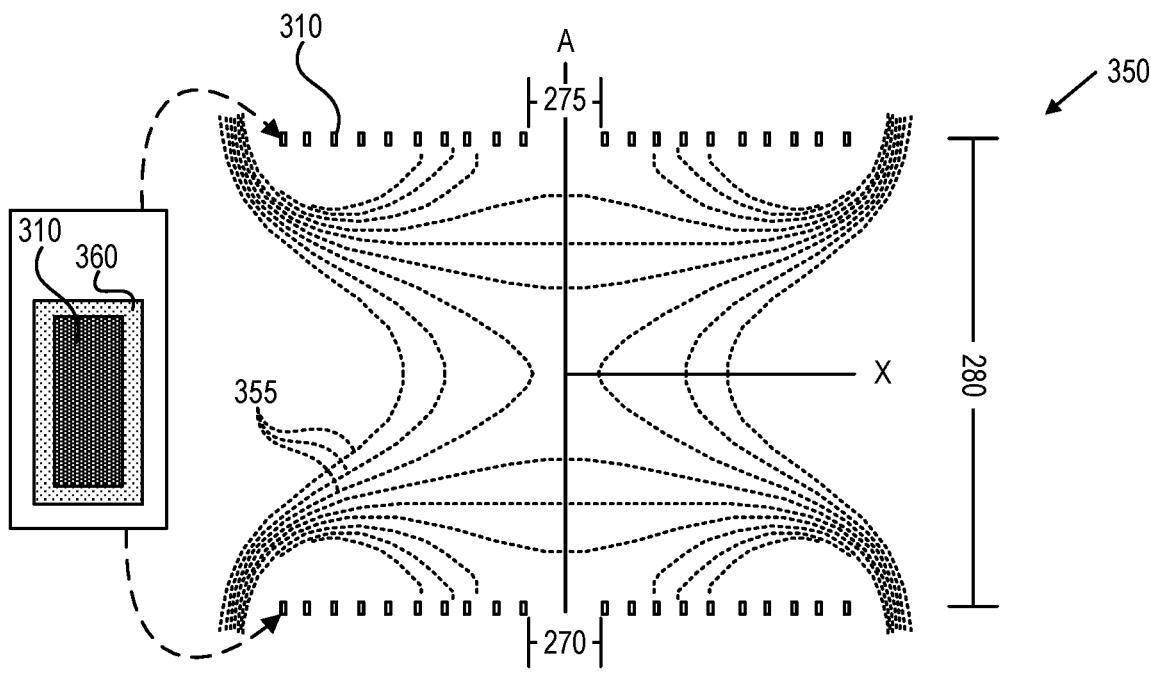
FIG. 3B is a schematic diagram illustrating an example magnetic field generated by the magnetic confinement system of FIG. 3B, in accordance with some embodiments of the present disclosure.

As described in more detail in reference to FIGS. 3A-3B, apertures 270 and 275 can be the same size or different sizes. For example, first aperture 270 can be about 100 μm and second aperture can be about 1 cm, with corresponding modifications made to respective planar coils 215 (e.g., number of turns, operating current, etc.) to account for potential distortion of the magnetic field in the "Z" axial direction. In some embodiments, apertures 270 and 275 have the same size, shaped to accommodate sample 107, allowing planar coils 215 to be substantially symmetrical, as illustrated in the exemplary embodiments of FIGS. 3A-3B. For example, first aperture 270 and second aperture 275 can both be about 0.1 cm wide, about 0.5 cm wide, about 1 cm wide, about 1.5 cm wide, about 2 wide, about 2.5 cm wide, about 3 cm, or the like, including fractions and interpolations thereof.

Example coil system 250 includes components that are at least partially disposed in or otherwise exposed to controlled environment 205 of FIG. 2A. For example, substrates 260 can be mechanically coupled with interior surfaces of instrument 205 to form a part of the boundary of controlled environment 205. In another example, substrates 260 can be disposed within controlled environment with little or no mechanical coupling with interior surfaces of instrument 105. As part of facilitating heat removal from planar coils 215, substrates 260 can be or include materials with relatively low electrical conductivity (e.g., insulating materials) and relatively high thermal conductivity. For example, substrates 260 can be or include materials such as aluminum nitride, boron nitride, silicon carbide-carbon composite, beryllium oxide-graphene composite, fiberglass-reinforced silicone, diamond-like carbon, and/or synthetic diamond. In some embodiments, 260 substrates can be formed from materials with relatively high electrical conductivity and relatively high thermal conductivity, such as aluminum, copper, graphene, or the like, as when an insulating layer is disposed over at least part of the planar coils 215, as described in more detail in reference to FIG. 3B.

Heat removal elements 265 and thermal couplings 267 can include structures configured to remove heat from planar coils 215 and/or substrates 260 during system 200 operation. In some embodiments, heat removal elements 265 include solid state cooling elements (e.g., Peltier coolers, or the like) and/or coolant systems (e.g., heat pumps, chillers, etc). Thermal couplings 267, in turn, can include structures and/or materials to facilitate heat exchange appropriate for the relevant heat transfer modality. For example, in the case of liquid coolant being used to remove heat from planar coils 215 and/or substrates 260, thermal couplings can include one or more coolant loops disposed in thermal contact with substrates 260 and configured to deliver cold coolant from heat removal element(s) 265 and return hot coolant to heat removal element(s) 265. In another example, Peltier coolers can be disposed in thermal contact with substrates 260 (e.g., using thermal paste to reduce interfacial resistance). In some embodiments, a single heat removal element 265 is coupled with both substrates 260 and/or planar coils 215, for example, where a chiller can be used to deliver coolant to both structures through parallel or serial coolant loops. In some embodiments, the planar coils 215 include a conduit through which liquid coolant can flow. In some embodiments, convective cooling of the planar coils 215 includes forced convection in the controlled environment 205 by circulating the gas therein.

FIG. 3A is a schematic diagram illustrating an example magnetic confinement system 300 for the spark gap system 200 of FIG. 2A, in accordance with some embodiments of the present disclosure. The system 300 of FIG. 3A includes capacitors 305, electronically coupled with respective planar coils 215. In this way, electric current "I" can be discharged into planar coils 215 by capacitor(s) 305 as part of generating a magnetic field between planar coils 215, as described in more detail in reference to FIG. 3B. Planar coils 215 define a coil plane "X-Y" with the axis A being normal to the coil plane, with conductive element 155 disposed in the aperture of first coil 215-1, substantially aligned with axis A. Sample 107 is not shown, illustrative of components of the spark gap device 200 of FIG. 2A absent a sample. The X-Y-A coordinate space is used in FIGS. 3A-3B as a reference frame that is not cylindrically symmetrical.

Planar coils 215 can include electrically conductive materials, such as copper or other metals, that are disposed (e.g., on substrates 260) in a number of turns 310 (also referred to as windings, turnings, etc.) about the axis A. In some embodiments, planar coils 215 are disposed by patterned deposition of metal layers or films onto substrates 260, by patterned removal of metal from substrates, or by mechanical turning of a metal wire. As described in more detail in reference to FIG. 2B, thermal load is a functional constraint on the dimensions, shape, and material selection of planar coils 215, while magnetic field strength is a functional constraint on the number of turns 310. Magnetic confinement can improve with increasing magnetic field strength, which is broadly proportional to the number of turns 310, but can be impacted by physical phenomena that can affect the magnetic field between planar coils 215. For example, planar coils can define from about 10 to about 50 turns 310, including subranges, fractions, and interpolations thereof. Without being bound to a single physical phenomenon, above 50 turns 310, electrical inductance can introduce delays in current transfer through planar coils 215 that can make discharge time too long for magnetic confinement and spark frequency to be corresponding. For example, spark OES systems can operate at a spark frequency from about 50 Hz to about 1000 Hz, including subranges, fractions, and interpolations thereof. As such, inductance effects that prolong the discharge rate of capacitor(s) 305 beyond a range from about 1 msec to about 20 msec, corresponding to the frequency range previously stated, can impair the performance of magnetic confinement, in turn reducing the improvement of OES data generation.

In some embodiments, system 300 includes capacitor(s) 305 configured to deliver a current to the planar coils 215 that generates a magnetic field between the planar coils (as illustrated in FIG. 3B) having a strength from about 1 kGs to about 5 kGs, where kGs is used to denote a unit of 1000 Gauss equivalent to 0.1 T. To that end, capacitor(s) 305 can have a capacitance rating from about 10 μF to about 1000 μF, including subranges, fractions, and interpolations thereof. In some embodiments, planar coils 215 are electrically coupled with multiple capacitors 305 in a bank (e.g., arrayed in parallel or other arrangement) as an approach to increasing the charge capacity and/or operable discharge frequency of the system 300. In this way, capacitor(s) 305 can be sized, specified, and/or selected to discharge an electric current from about 100 A to about 5 kA, including subranges, fractions, and interpolations thereof, into first planar coil 215-1, second planar coil 215-2, or both. In an illustrative example, first planar coil 215-1 and second planar coil 215-2 are electrically coupled with capacitors 305, either as a shared capacitor bank, separate capacitor banks, high capacity capacitors, or the like, having a charge capacity suitable to discharge from about 1 kA to about 2 kA into each planar coil 215 for a period of time corresponding to the spark frequency (e.g., from about 0.1 msec to about 50 msec), as described in more detail in reference to FIG. 4.

FIG. 3B is a schematic diagram illustrating an example magnetic field 350 generated by the magnetic confinement system 300 of FIG. 3A, in accordance with some embodiments of the present disclosure. Example field 350 is illustrated by a series of magnetic field lines 355, indicated by dashed lines that together define a magnetic field surface during a period of time during which current I (e.g., I1 and I2) is flowing through both planar coils 215. In the illustrated embodiment, planar coils 215 are substantially symmetrical about axis A and have apertures 270 275 that are substantially equal in width. The resulting magnetic field 350 is rotationally symmetrical about A in the coil plane X-Y for a given value of A, and mirror symmetrical about the central position of offset 280. In this way, field 350 exerts a force on an arc discharge, including currents of electrons and ions that are substantially aligned with axis A, that acts to bring the arc into alignment with axis A as the arc migrates in the X and/or Y directions.

Planar coils 215, including multiple turns 310, can be at least partially covered by insulating layer(s) 360 disposed over at least part of the planar coils 215. For example, a first insulating layer 360 can be disposed over at least one or more turns 310 of first planar coil 215-1 and a second layer 360 can be disposed over at least one or more turns 310 of second planar coil 215-2. Similarly, insulating layer 360 can be disposed over a portion of a turn 310. In some embodiments, insulating layer 360 is disposed over the turns 310 forming a substantially conformal layer. The insulating layer 360 can be electrically insulating and thermally conducting material. For example, the insulating layer 360 can include one or more materials selected from a group consisting of aluminum nitride, boron nitride, silicon carbide-carbon composite, fiberglass-reinforced silicone, diamond-like carbon, and synthetic diamond. Advantageously, selecting an electrically insulating material can permit the planar coils 215 to operate at a position that would otherwise attract the arc 160 to attach to one of the turns 310, rather than to the sample 107 or conductive element 155. Additionally, selection of a material that is both electrically insulating and thermally conductive can improve the performance of heat removal elements 265.

In an illustrative embodiment, a planar coil 215 is fabricated by a sequence of deposition-etch processes (e.g., CMOS compatible fabrication techniques) that include forming substrate 260, planar coil 215, and insulating layer 360. For example, a conductive (e.g., metal) layer can be deposited onto substrate 260, from which a pattern of turns 310 and contacts for electronic components (e.g., capacitors 305) can be formed by selective removal of a portion of the conductive layer (e.g., by masking and reactive ion etching). Subsequent to the formation of the planar coil 215, insulating layer 360 can be deposited onto substrate 260 and/or planar coil 215. In this way, spark gap devices of the present disclosure include components fabricated as planar circuit components.

Figure 4:
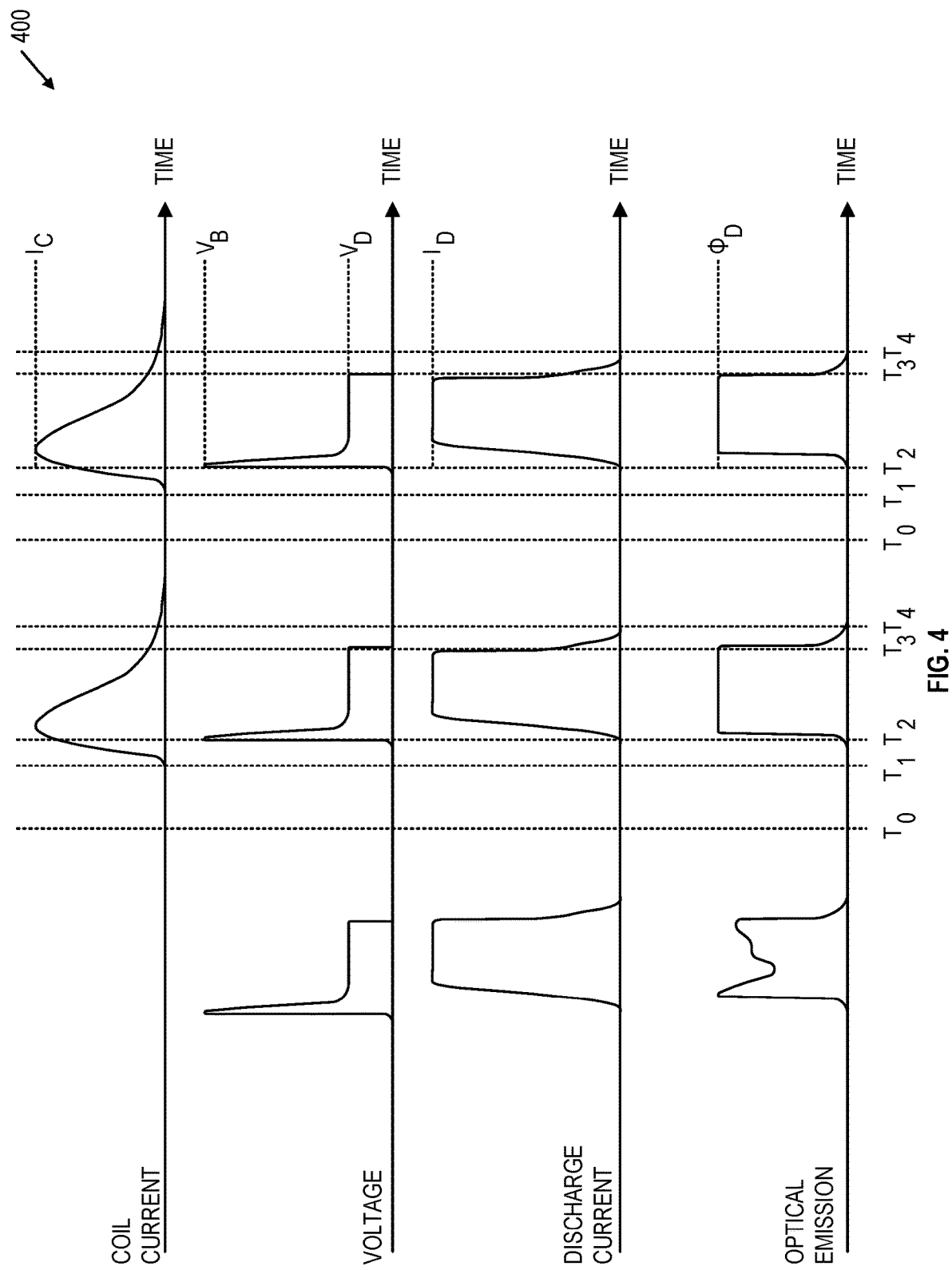
FIG. 4 is a schematic sequence of electrical signals illustrating an example spark OES process with magnetic confinement, in accordance with some embodiments of the present disclosure.

FIG. 4 is a schematic sequence of electrical signals illustrating an example spark OES process 400 with magnetic confinement, in accordance with some embodiments of the present disclosure. Example process 400 includes sequences for current through planar coil(s) 215, voltage applied to sample 107 and/or conductive element 155, discharge current carried by discharge 160, and optical emission detected by spectrometer 165, as functions of time during a sequence of measurements, as described in more detail in reference to FIGS. 1A-1B. One or more of the measurements can be omitted and/or replaced in embodiments of the present disclosure. For example, a spark OES system can omit discharge current measurements. In some embodiments, example process 400 includes a timing signal, used to orchestrate the operation of the components of the spark gap device. The signals illustrated are not drawn to scale and are described schematically to illustrate relative timings and general coordination of operations during example process 400.

A sequence of operations for a single spark ignition is illustrated between time $T_0$ and time $T_4$, with a subsequent sequence beginning at the next iteration of $T_0$. To represents a timing trigger or other control signal that initiates a spark ignition sequence. The timing signal can be generated using a clock circuit or other electronic component of a computer system (e.g., IPC or client PC of FIG. 1A) and/or by software configured to generate a periodic signal with a known frequency. For example, the timing signal can include a 4 VDC square wave, such as a transistor-transistor logic (TTL) signal. In this way, components included in control circuitry can activate the various components of the spark gap device in reference to the TTL signal, for example, by software controlled timing using a delay or other approach. In an illustrative example, the timing signal can have a frequency of about 1 kHz, but can also be from about 50 Hz to about 2000 Hz, including subranges, fractions, and interpolations thereof, as part of configuration of the systems described in reference to FIGS. 1A-3B.

At time T1, capacitor(s) 305 is/are discharged into planar coils 215, generating a magnetic field in the vicinity of sample 107 and conductive element 155, as described in more detail in reference to FIGS. 3A-3B. At T2, the voltage source 210 ignites the discharge 160 concurrent with the magnetic field being applied to confine the position of the discharge 160. Discharge current is provided to illustrate that optical emission is proportional to discharge current, and that the current between sample 107 and conductive element 155 reaches the discharge current "$I_D$" after the voltage stabilizes at the discharge voltage "$V_D$," rather than at the breakdown or ignition voltage "$V_B$." In some embodiments, the discharge time of capacitors 305 can be estimated and/or determined with sufficient accuracy to extinguish the discharge 160 by removing the voltage prior to the quenching of the magnetic field. In some embodiments, however, other constraints, such as thermal load or voltage source 210 limits, can play a role in determining the relative duration between T4 and T1, and between T3 and T2. As such, between T2-T3, during which time the discharge is ignited and the coil current is flowing, can correspond to a duration from about 10 usec to about 1 msec, including fractions, subranges, and interpolations thereof. In some embodiments, the duration of time between T2 and T3 is about 100 usec.

The optical emission signal schematically demonstrates improved stability, relative to a system for which the discharge 160 is not magnetically confined. For comparison, an optical emission signal is provided in the leftmost set of signals preceding $T_0$, which correspond to a system for which magnetic confinement is not provided. The optical emission signal exhibits instability and a portion of the time during which the discharge is ignited where emission intensity is significantly below that shown for subsequent discharges that are magnetically confined (referred to as $\phi_D$ as described in reference to FIG. 1B). Over an integration time on the order of milliseconds, the aggregate effect of improved stability is illustrated clearly in FIGS. 7A-7B, described in reference to the example embodiment below.

Figure 5:
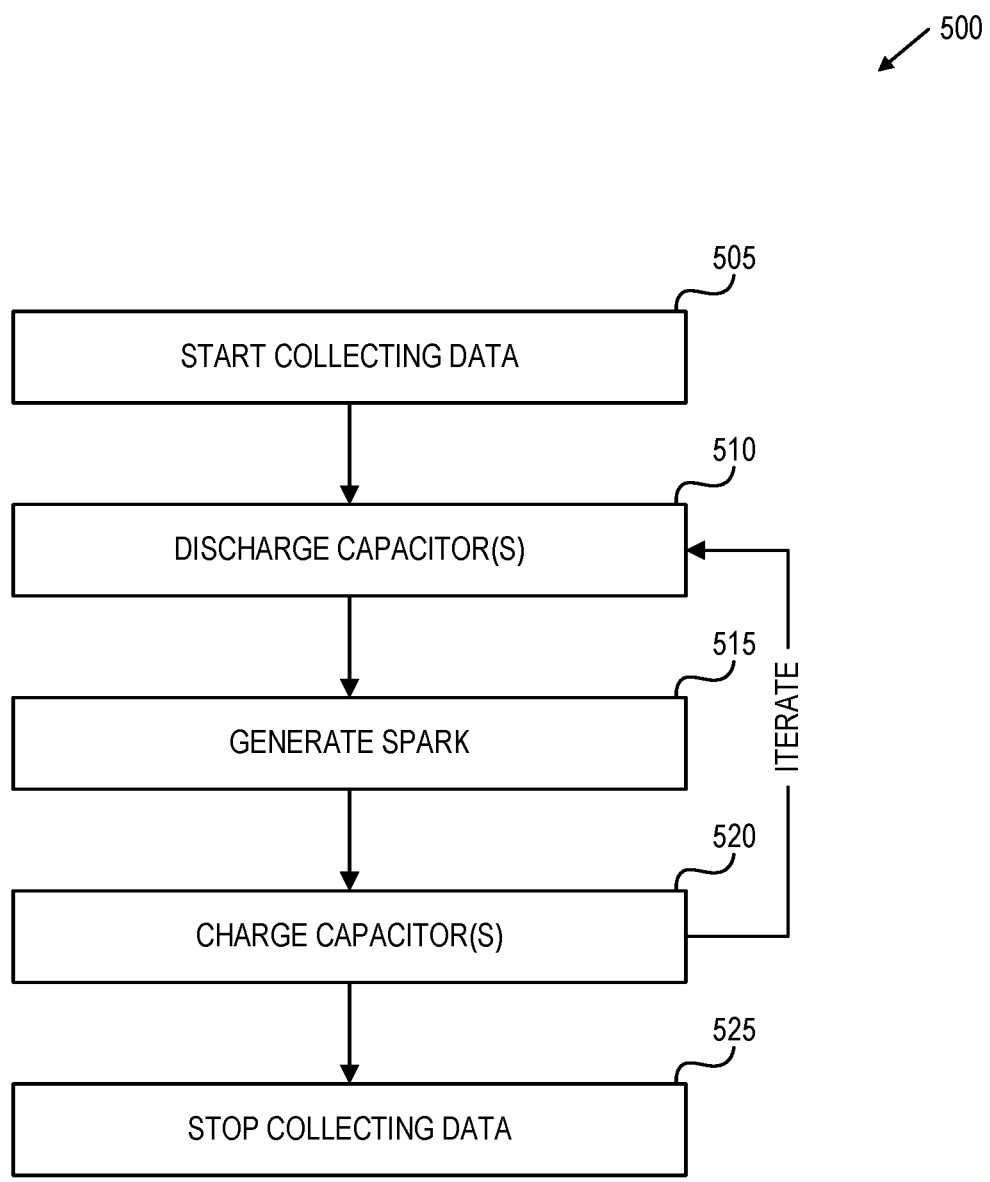
FIG. 5 is a block diagram illustrating an example process for spark OES using the magnetic confinement systems of FIGS. 2A-4, in accordance with some embodiments of the present disclosure.

FIG. 5 is a block diagram illustrating an example process 500 for spark OES using the magnetic confinement systems of FIGS. 2A-4, in accordance with some embodiments of the present disclosure. As described in reference to FIGS. 1A-4, one or more operations making up the example process 500 can be executed and/or initiated by a computer system or other machine operably coupled with components of an analytical instrument (e.g., example instrument 105 of FIG. 1A) and/or additional systems or subsystems including, but not limited to, characterization systems, network infrastructure, databases, controllers, relays, power supply systems, and/or user interface devices. To that end, operations can be stored as machine executable instructions in one or more machine readable media that, when executed by the computer system, can cause the computer system to perform at least a portion of the constituent operations of process 500. The constituent operations of process 500 can be preceded by, interspersed with, and/or followed by operation(s) that are omitted from the present description, such as sample and/or instrument preparation, operations that take place prior to operations 505 to 525, or the like, that form at least a part of an analytical method for processing a sample to generate spectral data as illustrated in FIGS. 5A-5B. To that end, operations of the example process 500 can be omitted, repeated, reordered, and/or replaced in some embodiments.

At operation 505, spectrum data collection can be part of a measurement including multiple iterations of a spark ignition sequence. As described in more detail in reference to FIG. 4, spark OES measurements can include integration of optical emission from tens, hundreds, thousands, or more individual discharges 160. To that end, operation 505 can include initialization and internal calibration routines for a spectrometer (e.g., spectrometer 165 of FIG. 1B), as well as operations directed at an individual iteration of discharge ignition. Examples of such operations include opening a shutter and/or energizing a sensor or sensors in coordination with operations 510-520 that reduce the influence of background on signal integration. Data, in this context, can include emission spectra and other data, such as metadata, timing data, electronic signal data (e.g., as illustrated in FIG. 4), or the like.

At operation 510, capacitor(s) (e.g., capacitor(s) 305 of FIG. 3A) are discharged into planar coils (e.g., planar coils 215 of FIG. 2A), generating the magnetic field substantially aligned with the axis normal to the coil plane (e.g., axis A of FIG. 2B). As illustrated in reference to FIG. 4, ignition of the discharge (e.g., discharge 160 of FIG. 1B) is coordinated in time with at operation 515. In some embodiments, process 500 includes operations for charging capacitors as part of the iteration for each spark ignition sequence at operation 520. This is relevant, for example, where the same capacitor(s) is/are discharged at each iteration. In some embodiments, however, a bank of capacitors is used, permitting capacitor charging at a different cadence, for example, where capacitor charging and discharging occur at different time scales such that one-to-one discharging and charging is impractical.

At operation 525, the computer system stops collecting data. The number of iterations of example process 500 can be based at least in part on the signal intensity received. For example, operation 525 can be gated by a threshold count number, a relative background intensity, or the like. Advantageously, techniques for magnetic confinement described in the present disclosure can reduce the number of iterations of example process 500 significantly. In turn, overall system performance, in terms of sample throughput, power consumption, and tool maintenance are significantly improved as a result of improved optical emission signal intensity and quality, as described in more detail in reference to the example below and FIGS. 6A-7B.

Example: Enhancement of Spark OES Data by Magnetic Confinement

FIGS. 6A-7B are provided to demonstrate improvement to signal-to-noise characteristics and species identification in spark OES data resulting from the introduction of magnetic field confinement of arc discharges (e.g., discharge 160 of FIG. 1A and FIG. 2A). The magnetic field configuration employed in the present example induced an axially aligned field, substantially aligned with the discharge direction (e.g., between conductive element 155 and sample 107). In this way, the data represent the improvements in performance of spark OES systems of the present disclosure (e.g., example system 100 of FIG. 1A) relative to spark OES systems of the current art that omit magnetic confinement, as generated by spark gap devices of the present disclosure (e.g., example spark gap device 200 of FIG. 2A). Spark OES data were generated using an aluminum sample in an argon controlled environment at atmospheric pressure at a spark frequency of 200 Hz for an integration time of 10 seconds. As such, the spectra include emission lines from both the sample material and the environment. As described in reference to FIGS. 1A-1B, magnetic confinement improves spark OES data at least in part by reducing migration of discharge 160 relative to an optical collection region of spectrometer 165. In this way, improvements observed in FIGS. 6B and 7B include increased intensity of sample and environment lines. Spectra in FIGS. 6A-7B were collected with consistent optical parameters and electrical parameters, with the exception that FIGS. 7A-7B were generated using magnetic confinement that was not used when generating OES data in FIGS. 6A-6B.

Figure 6A:
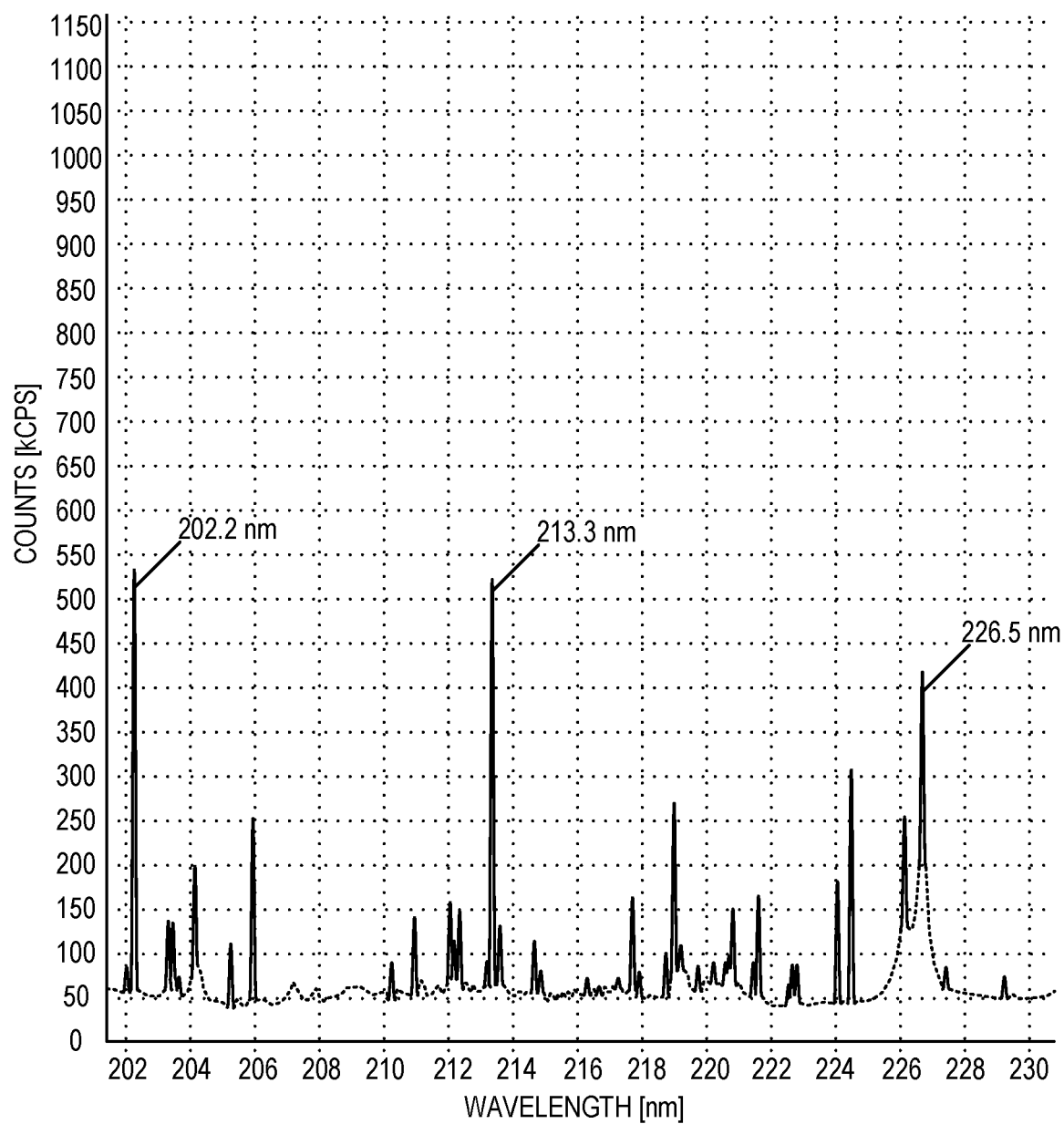
FIG. 6A is a spectrum of spark-OES data in the ultraviolet region from 202 nm-230 nm, generated in the absence of external magnetic field confinement, in accordance with the current art.

FIG. 6A is a spectrum of spark-OES data in the ultraviolet region from 202 nm-230 nm, generated in the absence of external magnetic field confinement, in accordance with the current art. FIG. 6A is an ultraviolet emission spectrum including counts on the ordinate and wavelength in nanometers on the abscissa. The wavelength range is from about 202 nm to about 230 nm. Spectral data is illustrated as a set of peaks indicated in solid black lines with other spectral data indicated in dashed lines to focus discussion on peaks. Without magnetic confinement, many peaks are discernible in OES spectra, with emission intensity values approaching about 450 counts to about 550 counts. For reference to FIG. 6B, three peaks are labeled at about 202 nm, about 213 nm, and about 226.5 nm.

Figure 6B:
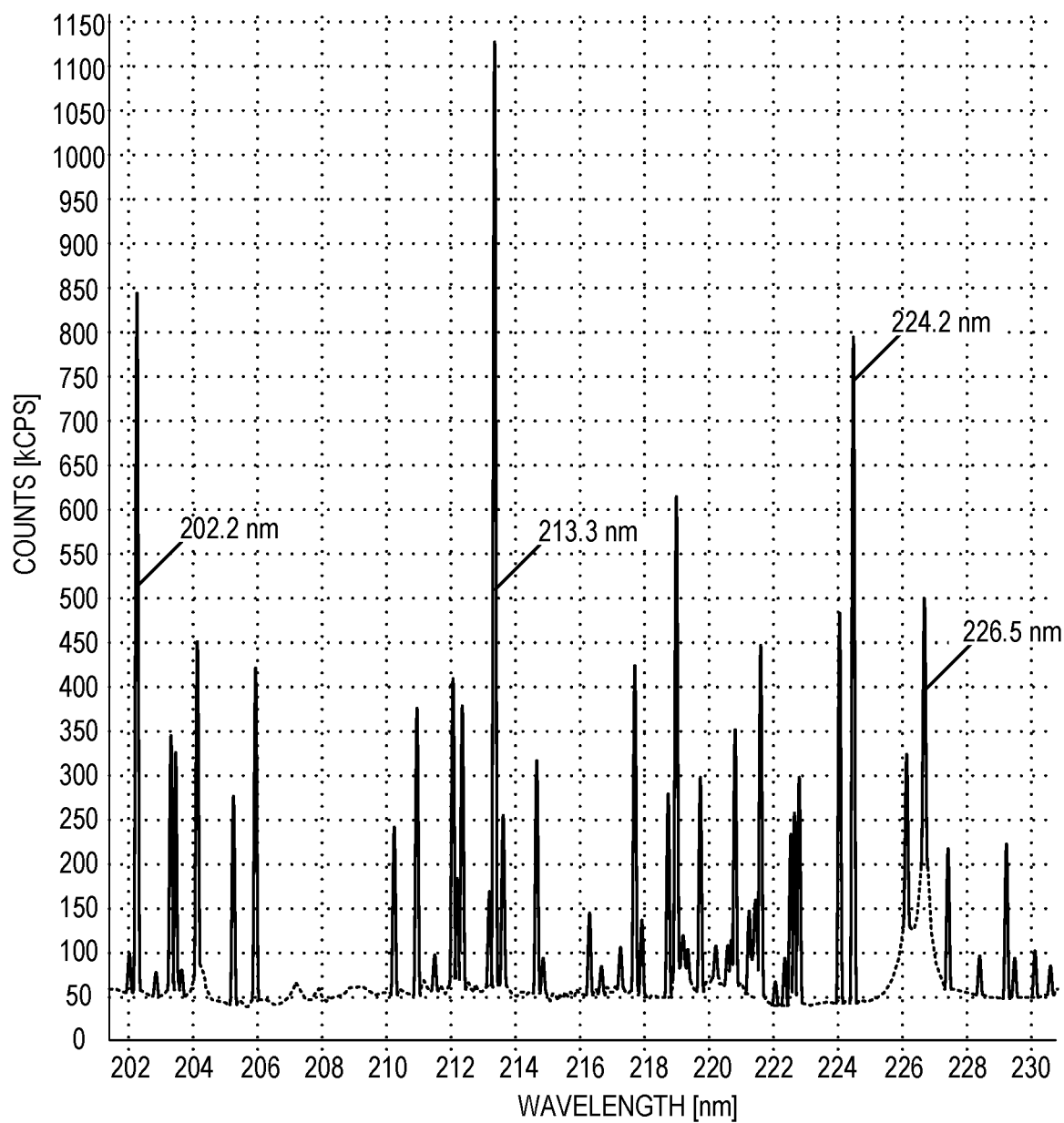
FIG. 6B is a spectrum of spark-OES data in the ultraviolet region from 202 nm-230 nm, generated in the presence of external magnetic field confinement, in accordance with some embodiments of the present disclosure, demonstrating an enhancement of signal to noise attributable to improved stability of spark discharge position.

FIG. 6B is a spectrum of spark-OES data in the ultraviolet region from 202 nm-230 nm, generated in the presence of external magnetic field confinement, in accordance with some embodiments of the present disclosure, demonstrating an enhancement of signal to noise attributable to improved stability of spark discharge position. In contrast to FIG. 6A, the addition of magnetic field confinement significantly increases the intensity of all peaks discernible in FIG. 6A, and introduces a number of peaks that are absent or not discernible from background in the spectrum of FIG. 6A. For example, the three peaks labeled in FIG. 6A approach an intensity of 850 counts, 1150 counts, and 500 counts, respectively. The peak at about 226 nm did not increase to as great an extent as the peaks at about 202 nm or about 213 nm, and the spectrum of FIG. 6B includes peaks (e.g., at about 224 nm) that have exceeded the intensity of the peak at about 226 nm, at about 800 counts, which are present in FIG. 6A at an intensity of about 300 counts.

Figure 7A:
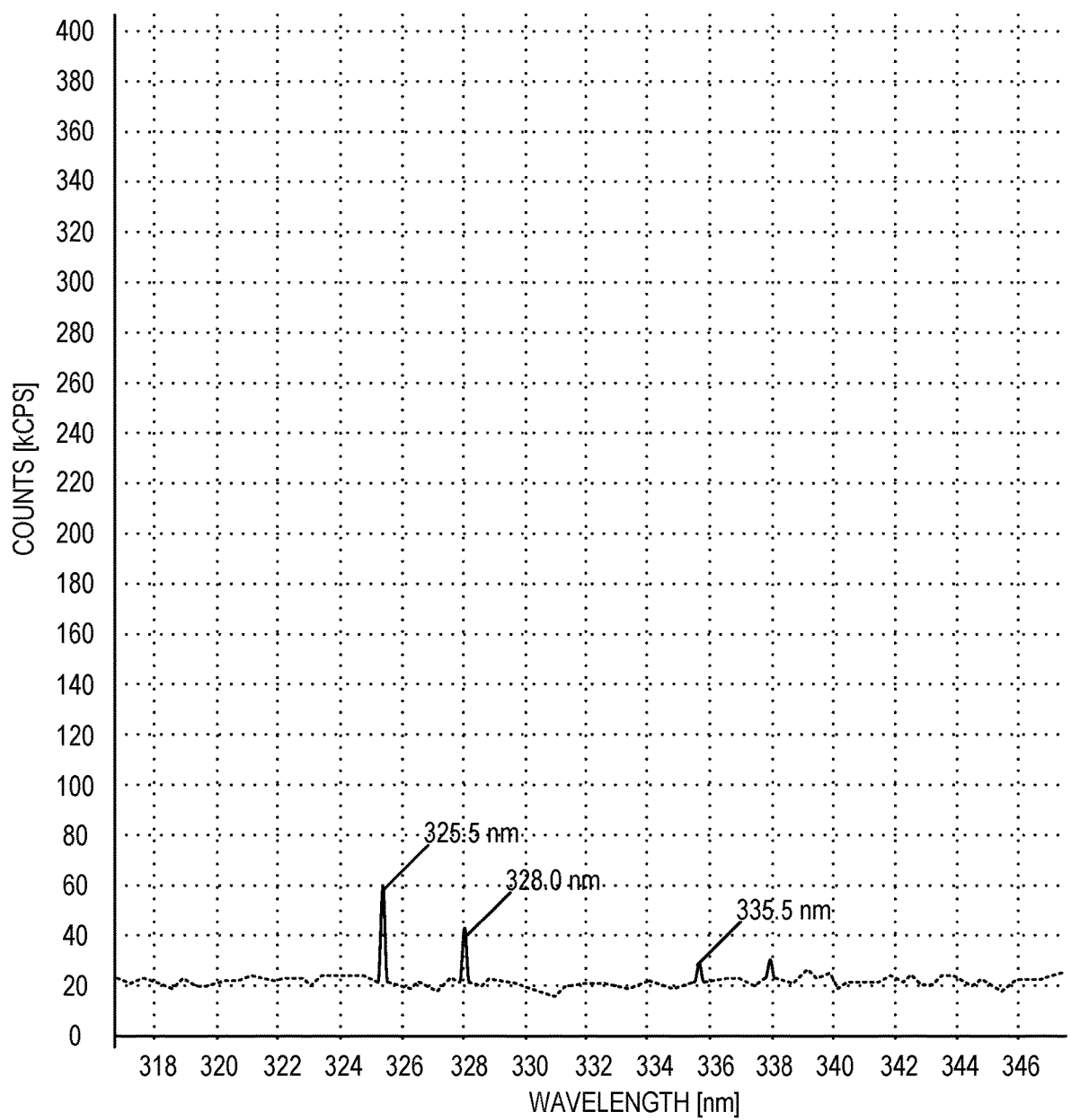
FIG. 7A is a spectrum of spark-OES data in the ultraviolet region from 318 nm-346 nm, generated in the absence of external magnetic field confinement, in accordance with the current art.

FIG. 7A is a spectrum of spark-OES data in the ultraviolet region from 318 nm-346 nm, generated in the absence of external magnetic field confinement, in accordance with the current art. FIG. 7A is an ultraviolet emission spectrum including counts on the ordinate and wavelength in nanometers on the abscissa. The wavelength range is from about 318 nm-346 nm. Spectral data are illustrated as a set of peaks indicated in solid black lines with other spectral data indicated in dashed lines to focus discussion on peaks. Without magnetic confinement, relatively few peaks are discernible in OES spectra, with emission intensity values approaching about 25 counts to about 60 counts. For reference to FIG. 7B, three peaks are labeled at about 325 nm, about 328 nm, and about 335 nm.

Figure 7B:
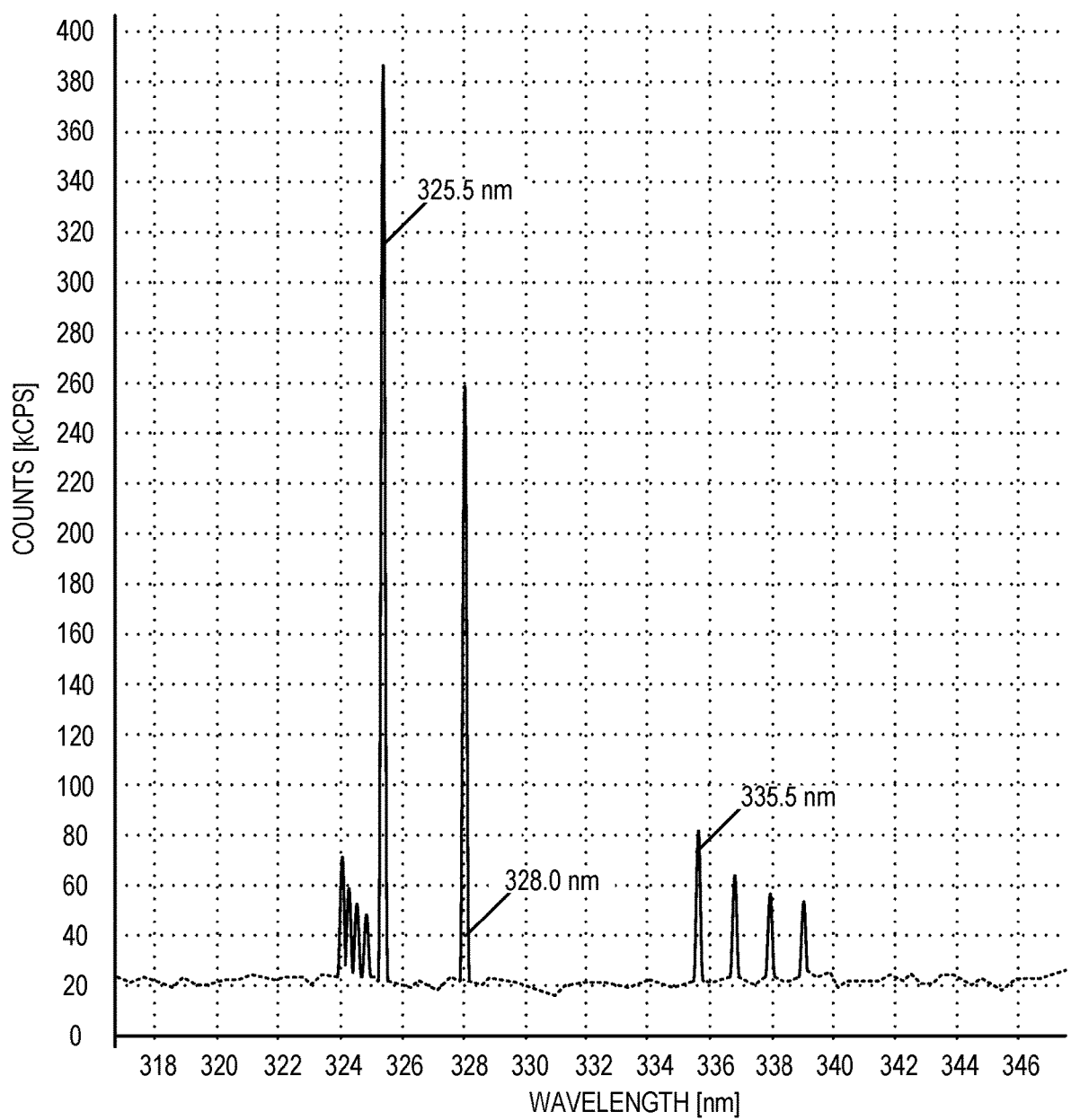
FIG. 7B is a spectrum of spark-OES data in the ultraviolet region from 318 nm-346 nm, generated in the presence of external magnetic field confinement, in accordance with some embodiments of the present disclosure, demonstrating an enhancement of signal to noise attributable to improved stability of spark discharge position.

FIG. 7B is a spectrum of spark-OES data in the ultraviolet region from 318 nm-346 nm, generated in the presence of external magnetic field confinement, in accordance with some embodiments of the present disclosure, demonstrating an enhancement of signal to noise attributable to improved stability of spark discharge position. In contrast to FIG. 7A, the addition of magnetic field confinement significantly increases the intensity of all peaks discernible in FIG. 7A, and introduces a number of peaks that are absent or not discernible from background in the spectrum of FIG. 7A. For example, the three peaks labeled in FIG. 7A approach an intensity of 390 counts, 260 counts, and 80 counts, respectively. The peak at about 335 nm did not increase to as great an extent as the peaks at about 325 nm or about 328 nm, but reveals that it forms a part of a set of peaks from which detailed plasma information can be derived (e.g., by actinometric comparison of relative peak heights). In this way, the improvement in signal collection illustrated in FIGS. 7A-7B, relative to the spectra illustrated in FIGS. 6A-6B, permits analyses that would not have been possible without magnetic confinement, in addition to the performance improvements described previously.

In the preceding description, various embodiments have been described. For purposes of explanation, specific configurations and details have been set forth in order to provide a thorough understanding of the embodiments. However, it will also be apparent to one skilled in the art that the embodiments can be practiced without the specific details. Furthermore, well-known features may have been omitted or simplified in order not to obscure the embodiment being described. While example embodiments described herein center on spectrometry systems, and optical emission spectrometry systems in particular, these are meant as non-limiting, illustrative embodiments. Embodiments of the present disclosure are not limited to such embodiments, but rather are intended to address analytical instruments systems for which a wide array of material samples can be analyzed to determine chemical, biological, physical, structural, or other properties, among other aspects, including but not limited to chemical structure, trace element composition, or the like, for which discharge spectroscopy is a constituent process.

Some embodiments of the present disclosure include a system including one or more data processors and/or logic circuits. In some embodiments, the system includes a non-transitory computer readable storage medium containing instructions which, when executed on the one or more data processors and/or logic circuits, cause the one or more data processors and/or logic circuits to perform part or all of one or more methods and/or part or all of one or more processes and workflows disclosed herein. Some embodiments of the present disclosure include a computer-program product tangibly embodied in non-transitory machine-readable storage media, including instructions configured to cause one or more data processors and/or logic circuits to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the claims. Thus, it should be understood that although the present disclosure includes specific embodiments and optional features, modification and variation of the concepts herein disclosed can be resorted to by those skilled in the art, and that such modifications and variations are considered to be within the scope of the appended claims.

Where terms are used without explicit definition, it is understood that the ordinary meaning of the word is intended, unless a term carries a special and/or specific meaning in the field of charged particle microscopy systems or other relevant fields. The terms "about" or "substantially" are used to indicate a deviation from the stated property within which the deviation has little to no influence of the corresponding function, property, or attribute of the structure being described. In an illustrated example, where a dimensional parameter is described as "substantially equal" to another dimensional parameter, the term "substantially" is intended to reflect that the two parameters being compared can be unequal within a tolerable limit, such as a fabrication tolerance or a confidence interval inherent to the operation of the system. Similarly, where a geometric parameter, such as an alignment or angular orientation, is described as "about" normal, "substantially" normal, or "substantially" parallel, the terms "about" or "substantially" are intended to reflect that the alignment or angular orientation can be different from the exact stated condition (e.g., not exactly normal) within a tolerable limit. For dimensional values, such as diameters, lengths, widths, or the like, the term "about" can be understood to describe a deviation from the stated value of up to +10%. For example, a dimension of "about 10 mm" can describe a dimension from 9 mm to 11 mm.

The description provides exemplary embodiments, and is not intended to limit the scope, applicability or configuration of the disclosure. Rather, the ensuing description of the exemplary embodiments will provide those skilled in the art with an enabling description for implementing various embodiments. It is understood that various changes can be made in the function and arrangement of elements without departing from the spirit and scope as set forth in the appended claims. Specific details are given in the description to provide a thorough understanding of the embodiments. However, it will be understood that the embodiments can be practiced without these specific details. For example, specific system components, systems, processes, and other elements of the present disclosure can be shown in schematic diagram form or omitted from illustrations in order not to obscure the embodiments in unnecessary detail. In other instances, well-known circuits, processes, components, structures, and/or techniques can be shown without unnecessary detail.

What is claimed is:

1. A spark gap device, comprising:
a first planar coil, defining an axis normal to a coil plane and defining a first aperture substantially centered about the axis;
a second planar coil, offset from the first planar coil along the axis and substantially parallel to the coil plane, the second planar coil defining a second aperture substantially centered about the axis;
a first substrate, thermally coupled with the first planar coil and electrically isolated from the first planar coil;
a second substrate, thermally coupled with the second planar coil and electrically isolated from the second planar coil; and
a conductive element disposed in the first aperture and substantially aligned with the axis.

2. The spark gap device of claim 1, wherein the first planar coil or the second planar coil defines a number of turns from about 10 turns to about 50 turns.

3. The spark gap device of claim 1, wherein the aperture is characterized by a width from about 100 μm to about 10 cm.

4. The spark gap device of claim 1, wherein the second planar coil is offset from the first planar coil by a distance from about 1 mm to about 50 mm.

5. The spark gap device of claim 1, wherein the first planar coil or the second planar coil is electrically coupled with a capacitor having a capacitance rating from about 10 μF to about 1000 μF.

6. The spark gap device of claim 1, further comprising a first insulating layer disposed over at least part of the first planar coil and a second insulating layer disposed over at least part of the second planar coil, wherein the first insulating layer and the second insulating layer comprise an electrically insulating and thermally conducting material.

7. The spark gap device of claim 6, wherein the first insulating layer or the second insulating layer comprises one or more materials selected from a group consisting of aluminum nitride, boron nitride, silicon carbide-carbon composite, fiberglass-reinforced silicone, diamond-like carbon, and synthetic diamond.

8. The spark gap device of claim 1, further comprising one or more heat removal elements, being thermally coupled with the first substrate or the second substrate and configured to draw heat from the first planar coil or the second planar coil.

9. A spectroscopy system, comprising:
a spark gap device, comprising:
a first planar coil, defining an axis normal to a coil plane and defining a first aperture substantially centered about the axis;
a second planar coil, offset from the first planar coil along the axis and parallel to the coil plane, the second planar coil defining a second aperture substantially centered about the axis;
a first substrate, thermally coupled with the first planar coil and electrically isolated from the first planar coil;
a second substrate, thermally coupled with the second planar coil and electrically isolated from the second planar coil;
a conductive element disposed in the first aperture and substantially aligned with the axis;
electronic circuitry operably coupled with the spark gap device, the electronic circuitry comprising a voltage source electrically coupled with the conductive element and a capacitor electrically coupled with the first planar coil or the second planar coil; and
a controller, operably coupled with the electronic circuitry and configured to execute operations comprising:
discharging the capacitor; and
applying a voltage to the conductive element.

10. The spectroscopy system of claim 9, wherein the operations further comprise:
generating a timing signal, characterized by a frequency from about 50 Hz to about 2000 Hz, wherein the controller is configured to use the timing signal to orchestrate at least some of the operations.

11. The spectroscopy system of claim 9, wherein the operations further comprise:
removing the voltage from the conductive element; and
charging the capacitor.

12. The spectroscopy system of claim 9, wherein the capacitor is configured to discharge a current from about 100 A to about 5 kA into the first planar coil or the second planar coil.

13. The spectroscopy system of claim 9, further comprising an optical spectrometer, oriented relative to the spark gap device to observe a region between the first planar coil and the second planar coil.

14. The spectroscopy system of claim 13, wherein the operations further comprise generating spectrum data using the optical spectrometer.

15. The spectroscopy system of claim 9, further comprising an isolation chamber, at least a portion of the spark gap device being disposed in the isolation chamber, the isolation chamber being configured to provide a controlled environment for the conductive element.

16. One or more non-transitory machine-readable storage media, storing instructions that, when executed by a machine, cause the machine to perform operations comprising:
discharging a capacitor, the capacitor being electrically coupled with a first planar coil or a second planar coil of a spark gap device, the spark gap device comprising:
the first planar coil defining an axis normal to a coil plane and defining an aperture substantially centered about the axis; and
the second planar coil being offset from the first planar coil along the axis and parallel to the coil plane;
a first substrate, thermally coupled with the first planar coil and electrically isolated from the first planar coil;
a second substrate, thermally coupled with the second planar coil and electrically isolated from the second planar coil; and
a conductive element disposed in the aperture and substantially aligned with the axis; and
applying a voltage to the conductive element of the spark gap device.

17. The storage media of claim 16, wherein the operations further comprise generating a timing signal, characterized by a frequency from about 50 Hz to about 2000 Hz, wherein the controller is configured to use the timing signal to orchestrate at least some of the operations.

18. The storage media of claim 16, wherein the operations further comprise generating spectrum data using an optical spectrometer oriented relative to the spark gap device to observe a region between the first planar coil and the second planar coil.

19. The storage media of claim 18, wherein the operations further comprise:
removing the voltage from the conductive element; and
charging the capacitor,
wherein a sequence of operations for the spark gap device comprises:

discharging the capacitor;
applying the voltage;
removing the voltage; and
charging the capacitor,
and wherein generating spectrum data coincides at least partially with applying the voltage.

\* \* \* \* \*